(12) United States Patent
Berkey et al.

(10) Patent No.: US 8,526,773 B2
(45) Date of Patent: Sep. 3, 2013

(54) OPTICAL FIBER WITH DIFFERENTIAL BIREFRINGENCE MECHANISM

(75) Inventors: George Edward Berkey, Pine City, NY (US); Valery A Kozlov, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 323 days.

(21) Appl. No.: 12/771,272

(22) Filed: Apr. 30, 2010

(65) Prior Publication Data

US 2011/0268399 A1 Nov. 3, 2011

(51) Int. Cl.
*G02B 6/02* (2006.01)

(52) U.S. Cl.
USPC ............... 385/123; 385/11; 385/12; 385/13; 385/122; 385/126

(58) Field of Classification Search
None
See application file for complete search history.

(56) References Cited

U.S. PATENT DOCUMENTS

| 4,339,173 | A | * | 7/1982 | Aggarwal et al. | 385/142 |
| 4,561,871 | A | * | 12/1985 | Berkey | 65/412 |
| 4,975,102 | A | * | 12/1990 | Edahiro et al. | 65/391 |
| 7,900,481 | B2 | * | 3/2011 | Gallagher et al. | 65/409 |
| 2002/0131738 | A1 | | 9/2002 | Shamoto et al. | 385/123 |
| 2004/0007026 | A1 | * | 1/2004 | Ishihara | 65/422 |

FOREIGN PATENT DOCUMENTS

| EP | 0147225 | 7/1985 |
| JP | 59-92929 | 5/1984 |
| JP | 61-215225 | 9/1986 |
| WO | WO2005/059612 | 6/2005 |

* cited by examiner

*Primary Examiner* — Uyen Chau N Le
*Assistant Examiner* — Chad Smith
(74) *Attorney, Agent, or Firm* — Svetlana Z. Short

(57) ABSTRACT

According to some embodiments, the optical fiber comprises: (i) a core having a first index of refraction $n_1$; (ii) a cladding surrounding the core and having a second index of refraction $n_2$, such that $n_1 > n_2$, wherein cladding has at two sets of stress rods extending longitudinally through the length of the optical fiber, wherein the two sets of stress rods have CTE coefficients and/or softening points different from one another and different from that of cladding.

10 Claims, 4 Drawing Sheets

OPTICAL FIBER WITH DIFFERENTIAL BIREFRINGENCE MECHANISM

BACKGROUND

The disclosure relates generally to optical waveguide fibers, and more particularly to optical fibers exhibiting single polarization or polarization maintenance properties, and/or high birefringence.

Optical fiber has become a favorite medium for telecommunications due to its high capacity and immunity to electrical noise. Polarization maintaining (PM) fibers and single polarization (SP) fibers have been widely used to produce linear polarized output in optical systems. These fibers are useful for ultra-high speed transmission systems and are also utilized as couplers' fiber for use with, and connection to, optical components (e.g., lasers, EDFAs, optical instruments, interferometric sensors, and fiber gyroscopes). The single polarization fibers and polarization maintaining fibers can either be active, which means that they are rare earth doped in the fiber core, or passive, which means no rare earth dopants are involved. The polarization characteristic of single polarization fiber means that the fiber propagates one, and only one, of two orthogonally polarized polarizations within a single polarization band while suppressing the other polarization by dramatically increasing its transmission loss.

Polarization maintaining fibers (also referred to as a polarization retaining fibers) can maintain the input linear polarization on one of two orthogonally oriented axes. These fibers are not single polarization fibers. A common polarization maintaining fiber (referred to as PANDA PM fiber herein) includes, as shown in FIG. 1, a circular core 12' surrounded by a pure silica cladding region 14' with two stress-inducing regions 13' (two stress rods) situated therein. Core 12' and the cladding region 14' are formed of conventional materials employed in the formation of optical fibers. The refractive index of the core material is greater than that of the cladding material. Current commercial PANDA type fibers, in order to obtain enough birefringence, have silica cladding and boron doped stress rods that that have greater than 20 wt % $B_2O_3$. During the draw process, because of silica cladding, the typical temperatures are grater than 1900° C., and these boron rods become quite fluid (low viscosity) relative to silica. During fiber draw the boron rods tend to "squirt", which need to be corrected by adding complexity to the fiber draw processes, and by drawing fiber at slow speeds. The complexity and slow drawing makes this fiber relatively costly.

The two stress-inducing regions 13' are formed of the same glass material, and thus have the same Coefficients of Thermal Expansion (CTE). The two stress-inducing regions 13' also have composition different from core and cladding materials, and a CTE different from that of cladding material 14'. When such a fiber is drawn, the longitudinally-extending stress-inducing regions 13' will shrink by a different amount than that of the cladding material, whereby fiber core 12' will be put into a state of mechanical strain. Strain induced birefringence (otherwise referred to a stress-induced birefringence) is imparted in the fiber and thereby reduces coupling between the two orthogonally polarized fundamental modes.

No admission is made that any reference cited herein constitutes prior art. Applicant expressly reserves the right to challenge the accuracy and pertinence of any cited documents.

SUMMARY

The following definitions and terminology are commonly used in the art.

Refractive index profile—the refractive index profile is the relationship between the optical fiber material refractive index and the optical fiber radius (as measured from the centerline of the optical fiber) over a selected portion of the fiber.

Birefringence—birefringence is the difference between the effective refractive indices of the two orthogonally polarized states of the fundamental mode in optical fiber.

Radii—the radii of the fiber segments are generally defined in terms of points where the index of refraction of the material changes because the material used takes on a different composition. For example, the central core has an inner radius of zero because the first point of the segment is on the centerline. The outer radius of the central core segment is the radius drawn from the waveguide centerline to the last point of the refractive index of the central core having a positive delta. For a segment having a first point away from the centerline, the radius of the waveguide centerline to the location of its first refractive index point is the inner radius of that segment. Likewise, the radius from the waveguide centerline to the location of the last refractive index point of the segment is the outer radius of that segment. For example, a down-doped annular segment surrounding the central core would have an outer radii located at the interface between the annular segment and the cladding.

Relative refractive index percent Δ %–the term Δ % represents a relative measure of refractive index defined by the equation:

$$\Delta\% = 100 \times (n_i^2 - n_c^2)/2n_i^2$$

where Δ % is the maximum refractive index of the index profile segment denoted as I; and $n_c$, the reference refractive index, is taken to be the refractive index of the cladding layer. Every point in the segment has an associated relative index measured relative to the cladding.

According to at least some embodiments of the present invention the optical fiber includes:

(i) a core having a first index of refraction $n_1$;
(ii) a cladding surrounding the core and having a second index of refraction $n_2$, such that $n_1 > n_2$, said cladding having at least two stress rods extending longitudinally through the length of said optical fiber, and the stress rods in one set of said least two sets of glass stress rods having different CTEs and/or softening points from CTEs and/or softening points of the other set of stress rods; and
(iii) wherein the optical fiber supports a single polarization mode or poses polarization maintaining properties within the operating wavelength range.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
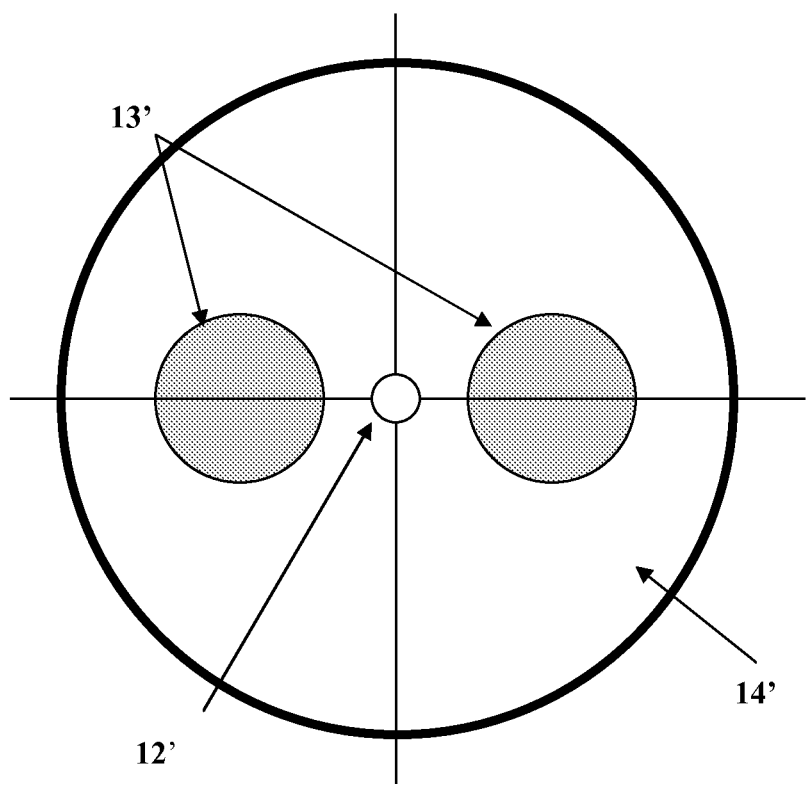
FIG. 1 is a schematic cross-sectional view of a prior art optical fiber.
Figure 2:
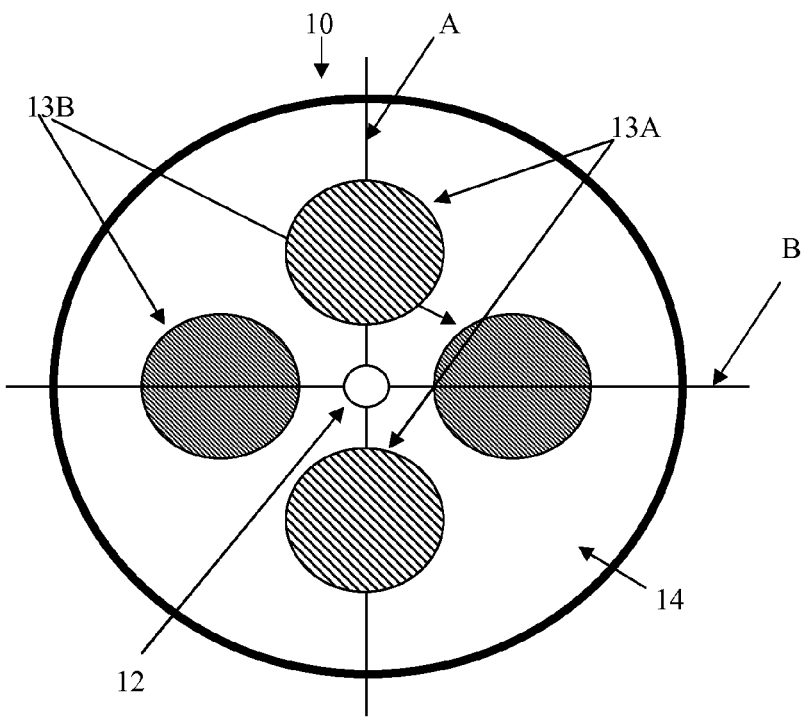
FIG. 2 is a schematic of the cross-sectional view of an embodiment of the optical fiber containing a plurality stress rods.

With reference to FIG. 2, according to some embodiments, the optical fiber 10 includes a silica based core 12; a cladding 14 surrounding the core 12; and a plurality of stress rods 13A, 13B (i.e., stress applying parts) situated inside the cladding 14 and extending longitudinally through the length of the optical fiber 10. The stress rods 13A, 13B have different Coefficients of Thermal Expansion (CTEs) from one another, and from the cladding's CTE. Cladding 14 may be silica based, with or without dopants, but other types of glass may also be used for cladding material. When two types of stress rods are used, for example two pairs of stress rods 13A, 13B, the stress rods create stress-induced birefringence with different signs. That is, stress created by stress rod pair will have a different sign from the stress created by another stress rod pair. This will increase total stress in the core material, and therefore increase birefringence (or decrease beat length) of the PM or SP fiber 10. For example, in some embodiments, the fiber beat length is about 3 mm to 25 mm at 1550 nm wavelength. Alternatively, or in addition to having different CTEs stress rods 13A, 13B (i.e., stress applying parts) may be made of glass with a different softening points, which create different mechanical strain induced birefringence on the core. It is noted that the viscosity, and thus the softening point of silica glass can be dramatically altered by adding chlorine to the glass, without significantly affecting its refractive index.

The fiber core 12 can either be round or elliptical. When it is round, it is specified by the core radius $R_{core}$. The location and the dimensions of the stress rods 13A, 13B are specified by the distance $D_{rod}$ (which is the distance from the edge of the stress rod 13A, 13B to the edge of the fiber core 12), and stress rod radius $R_{rodA}$, $R_{rodB}$. The distance $D_{rod}$ may be, for example, 0 to about 17 µm, for example 0 µm, 1 µm, 5 µm, or 10 µm. The refractive index n of each part of the fiber is specified by the delta relative to the cladding. For the optical fiber 10 of FIG. 2 there are three delta values (relative to cladding) to be specified, which are delta of the core $\Delta_{core}$, and deltas of the two types of stress rods, $\Delta_{rodA}$ (for stress rod(s) 13A), $\Delta_{rodB}$ (for stress rod(s) 13B). It is preferable that $\Delta_{rodA}$ and $\Delta_{rodA}$ be less 0.1%. Preferably $\Delta_{core}$ is 0.2% to 2%, for example 0.2% to 0.5% or 0.2% to 1%.

Core 12 has a first index of refraction $n_1$. The cladding 14 has a second index of refraction $n_2$, such that $n_1 > n_2$. The stress rods 13A and 13B are made from different glasses and have different CTEs. For example, in a fiber utilizing two boron doped stress rods and two pure silica stress rods, the CTE of boron-doped silica glass (20 wt. % of boron) of rods is about $3*10E^{-6}/°$ C., and the CTE for stress rods made of pure silica glass is about $5.4*10E^{-7}/°$ C. Therefore, stress rods 13A, 13B create mechanical stresses with opposite signs in the fiber core area. As stated above, the stress rods 13A and 13B are also made from different glass than that of the cladding 14 and thus have CTEs that are different than the cladding's CTE.

Preferably, the optical fiber 10 supports a single polarization mode, or has polarization maintaining properties within the operating wavelength range. For example, if the cladding includes boron, the stress rod(s) 13A may be made of pure silica to create stress in the fiber core in a vertical direction. Alternatively, if the cladding 14 includes 3 wt % B, stress rods 13A may be silica doped with less B (e.g., 0.5 to 2.5 wt % $B_2O_3$). B-doped stress rods (rods 13B in FIG. 2), for example, may be used to create a stress in a PM fiber core area along horizontal direction, but in such embodiment rods 13B also have a different amount of B than that in cladding 14. For example, if the cladding 14 includes 3 wt % $B_2O_3$, rods 13B have more B (e.g., 5 wt % to 25 wt % $B_2O_3$).

The two sets of rods 13A, 13B have different compositions to preferably create stresses in the horizontal and vertical directions, such that these stresses have opposite signs, which increase fiber birefringence. For example, if stress rods 13B are made of B doped silica, stress rods 13A may be silica doped with F. Alternatively one set of rods may be made of pure silica, and the other set of stress rods may comprise silica doped with F. Other dopants may also be utilized to create stress on the core in the horizontal direction with opposite sign to the stress in the vertical direction.

In some embodiments one set of stress rods has CTEs of about $5*10E^{-7}/°$ C., and the CTEs of another set of stress rods are about $5*10E^{-6}/°$ C. In some embodiments one set of stress rods has CTEs of about $4*10E^{-7}/°$ C. to $1*10E^{-6}/°$ C. (for example $5*10E^{-7}/°$ C. to $8*10E^{-7}/°$ C.) and the other set of stress rods has CTES greater than $2*10E^{-6}/°$ C. (for example $4*10E^{-6}/°$ C. to $8*10E^{-6}/°$ C.).

In some embodiments, the cladding 14 is silica based glass that is doped with B, and optionally other dopants. In other embodiments the cladding 14 is silica based glass that is doped with Cl (e.g., 0.3 wt % to 1 wt %). In some embodiments the stress applying parts are two stress rods 13A and two stress rods 13B, which have a CTE that is different from that of the cladding material. For example, stress rods 13A comprise silica doped with a higher amount of B than that of cladding 14 and, stress rods 13A comprise pure silica glass. In some embodiments the cladding 14 is pure silica cladding and one set of stress rods may be doped with B, while the other set of stress rods may be doped with F. The stress rods 13A, 13B create stress birefringence through elasto-optic effects in the core region. The radii $R_{rodA}$ of the stress rods 13A are between 4 and 20 µm, preferably 10 and 20 µm, for example 10 µm, 12 µm or 18 µm. The stress rods 13A are located outside of the fiber core 12. The radii $R_{rodB}$ of the stress rods 13B are between 4 and 20 µm, preferably between 10 µm and 20 µm, for example, 10 µm, 12 µm or 18 µm. The stress rods 13B are located outside of the fiber core 12. However, the stress rods 13A, 13B do not have to have a circular cross-section, and may have other geometries. For example, the stress rods within either stress rod pair may forme "bow" type configuration.

In the following embodiments, the relative refractive index delta ($\Delta_{core}$) of the core 12 with respect to the cladding 14 is between 0.1% and 2%, more preferably between 0.2% and 1.0%, even more preferably below 0.7% or below 0.5% and most preferably between 0.3% and 0.5%. If the core 12 is circular, the radius $R_{core}$ of the core 12 is in the range 1-10 µm, more preferably 2.5-8 µm. For example, the radius of the core may be 3.8 µm, 4 µm, 4.3 µm, 4.5 µm, or 5 µm. The radius of the cladding 14 is between 20 µm and 100 µm, with the preferred values to be around 40 to 62.5 microns. The core 12 in at least some of the embodiments is doped with an index raising material. Preferably, the index raising dopant is $GeO_2$.

According to the some embodiments, the fiber core 12 includes, Ge 0.2 to 15 wt %; and in the following exemplary embodiments the amount of Ge in the core is about 6 wt %. According to the some embodiments, the cladding 14 includes 97 wt % $SiO_2$ and 3 wt. % B. However, the cladding may be, for example pure silica, or silica doped with 1 to 5 wt % of $B_2O_3$, for example 2.5 to 3.5 wt % $B_2O_3$.

Various embodiments will be further clarified by the following examples.

Embodiment 1

In this embodiment the optical fiber 10 is a PM fiber, and the cladding 14 is made of Vycor$^R$ glass available from Corning Incorporated, of Corning, N.Y. The Vycor$^R$ glass is not a pure silica material. It is a silica based glass that includes boron. In this exemplary embodiment, the cladding 14 includes Vycor$^R$ glass which comprises about 97 wt % silica glass and about 3 wt % $B_2O_3$. The optical fiber embodiment of FIG. 2 utilizes two stress rods 13A, and two stress rods 13B. In this embodiment the stress rods 13B are have an axis of symmetry (Axis B) orthogonal to the one for rods 13A (Axis A). The stresses created by the two pairs of stress rods will generally be applied to the fiber core 12 along these axes. It is noted that a larger number of stress rods may also be utilized. For example, four or six smaller stress rods 13A and/or 13B may be used instead of two larger stress rods 13A or 13B.

Stress rods 13A and 13B have different glass compositions and have different CTEs from each other and from that of the cladding material (e.g., materials that have different CTEs than Vycor$^R$ glass). For example, the B doped stress rods of this embodiment have a CTE of $2*10E^{-6}/°$ C., while pure silica rods have a CTE of $5.4*10E^{-7}/°$ C., and the cladding has a CTE of about $8*10E^{-6}/°$ C. The terms "pure silica" or "pure silica glass" as used herein means $SiO_2$ glass with less than 0.1 wt % Cl (more preferably with less than 0.05 wt % Cl), less than 5 ppb of OH, and with no other dopants.

Figure 3:
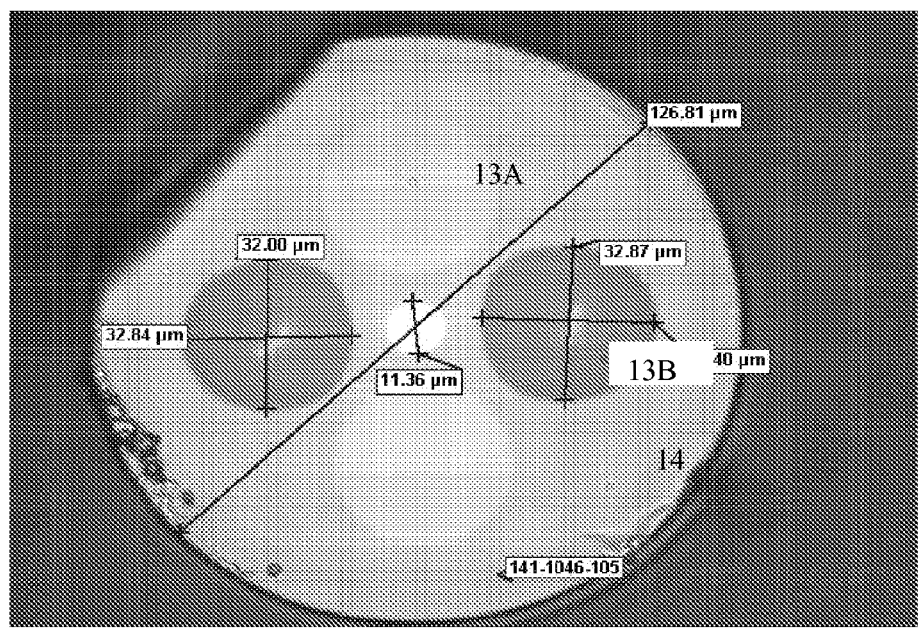
FIG. 3 illustrates a cross-sectional view of one embodiment of a drawn fiber containing two pairs of stress rods.

FIG. 3 shows a cross section of a drawn fiber, similar to that of the fiber in FIG. 2. The diameter of the optical fiber 10 of FIG. 3 is about 126 μm, the core diameter is about 11.4 μm, and each stress rod diameter is 32 μm to 33 μm. In this exemplary fiber, the fiber cladding material is 97 wt. % $SiO_2$ and 3 wt. % B. The core material is $SiO_2$ doped with about 6 wt % $GeO_2$ to provide $\Delta_{core}$=0.25%. One pair of stress rods (rods 13B) is pure silica glass, another pair of stress rods (rods 13A) is $SiO_2$ doped with boron (about 12 wt %). The stress rods 13A and 13B generate mechanical stresses in the fiber core area that have opposite signs.

Comparative Example

This comparative example is similar to the optical fiber 10 of Embodiment #1, because it utilizes the same core 12 ($SiO_2$ doped with about wt % Ge to provide $\Delta_{core}$=0.25%), cladding 14 (the cladding is silica based glass which comprises about 97 wt % silica glass and about 3 wt % boron), but the stress rods 13A are made of silica doped with the same amount of B (3 wt. %) as the cladding 14. The stress rods 13B of this comparative example are pure silica. The fiber diameter is about 127 μm, the core diameter is about 10.8 μm, and the stress rod diameters are 33 μm to 35 μm. This design does not generate mechanical stresses in the PM fiber core area that have opposite signs.

Embodiment #2

This embodiment is similar to the Example 1 embodiment. The optical fiber 10 of Embodiment 2 also includes a cladding 14 that is silica based glass that comprises about 97 wt % silica glass and about 3 wt % $B_2O_3$, but the stress rods 13A are pure silica. The stress rods 13A may be located right next to the core, or may be separated from the core by a small distance, with the distance $D_{rod}$ being 0 to 10 μm. The stress rods 13B of this exemplary embodiment are silica doped with P (5 wt %) and are separated further away from the core than rods 13A (e.g., rods 13B are separated by at least 10 μm from the core, edge to edge). Thus, the mechanical stress created by the stress rods across the core in the vertical direction (axis A) is of opposite sign from the stress in the horizontal direction (axis B). That is, along one of the axes, the stress is compressive, while along the other axis the stress is tensile. The fiber birefringence of the optical fiber 10 is the result of the stress differential created by the stress rods 13A and 13B. In addition, in this embodiment, the glass of stress rods 13A has a different softening point than that of the glass of stress rods 13B. The final fiber birefringence is the result of the stress differential created by the stress rods 13A and 13B, where the stress is created from the difference in CTEs, and also from the mechanical strain due to usage of materials with different softening points.

Embodiment 3

This embodiment is similar to the Example 1 embodiment. The optical fiber of Embodiment 4 includes) silica based cladding 14 with 0.3 to 1 wt % Cl and the stress rods 13A are B doped silica at least 12 wt % $B_2O_3$ (e.g., 12 wt % to 25 wt %), and stress rods 13B are pure silica (i.e., silica with less than 0.1 wt % Cl, and less than 5 ppb of OH, and no other dopants). In this embodiment the cladding 14 and the stress rods 13B have only slightly different CTEs, but the softening points of glass materials for the cladding and of the stress rods are very different, and thus set up a mechanical strain induced birefringence which is significantly greater than the strain resulting from the difference in CTE birefringence of the two materials. This fiber embodiment also has mechanical stresses in fiber core area that have opposite signs.

Embodiment 4

This embodiment is similar to the Example 1 embodiment. Embodiment 4 fiber utilizes boron doped (3 wt %) silica based cladding 14, but the stress rods 13A are pure silica and the stress rods 13B are silica doped with F and Ge (5 wt % each). In this embodiment the cladding 14 and the stress rods 13A and 13B will have different CTEs from one another. In addition softening points of glass materials for the cladding and of the stress rods 13A and the stress rods 13B are also different from one another. Thus the fiber core experiences mechanical strain induced birefringence as well as the strain resulting from the difference in CTE birefringence of the two stress rod materials. This fiber embodiment also has stresses in the fiber core area that have opposite signs. It is noted that stress rods 13B may be silica doped with F only (i.e., no Ge).

Embodiment 5

In this embodiment the optical fiber 10 is similar to that of Embodiment 1 fiber, but the cladding 14 is made of silica doped with 0.5 wt % F. The optical fiber embodiment of FIG. 2 utilizes two stress rods 13A, and two stress rods 13B. In this embodiment the stress rods 13B are have an axis of symmetry (Axis B) orthogonal to the one for rods 13A (Axis A). The stresses created by the two pairs of stress rods will generally be applied to the fiber core 12 along these axes. It is noted that a larger number of stress rods may also be utilized. For example, four or six smaller stress rods 13A and/or 13B may be used instead of two larger stress rods 13A or 13B. Stress rods 13A and 13B have different glass compositions and have different CTEs from each other and from that of the cladding material (e.g., materials that have different CTEs than Vycor$^R$ glass). For example, the B doped stress rods of this embodiment have a CTE of $2*10E^{-6}/°C$., while pure silica rods have a CTE of $5.4*10E^{-7}/°C$., and the cladding has a CTE of about $8*10E^{-6}/°C$. The diameter of the optical fiber 10 of about 126 µm, the core diameter is about 11.4 µm, and each stress rod diameter is 32 µm to 33 µm. In this exemplary fiber, the fiber cladding material is 99.5 wt. % $SiO_2$ and 0.5 wt. % F. The core material is $SiO_2$ doped with about 6 wt % $GeO_2$ to provide $\Delta_{core}$=0.25%. One pair of stress rods (rods 13B) is pure silica glass, another pair of stress rods (rods 13A) is $SiO_2$ doped with boron (about 12 wt %). The stress rods 13A and 13B generate mechanical stresses in the fiber core area that have opposite signs. However, other amounts of F in the cladding may also be utilized, for example 0.1 to 2 wt % F.

Fiber Manufacturing

Figure 4:
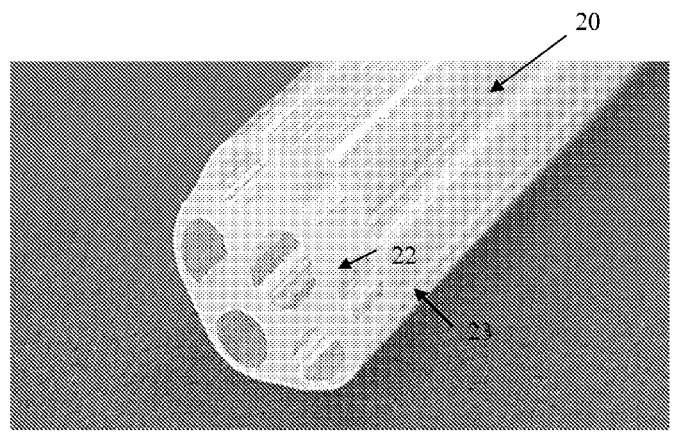
FIG. 4 is the view of an exemplary core-clad blank, with 4 drilled holes.
Figure 5:
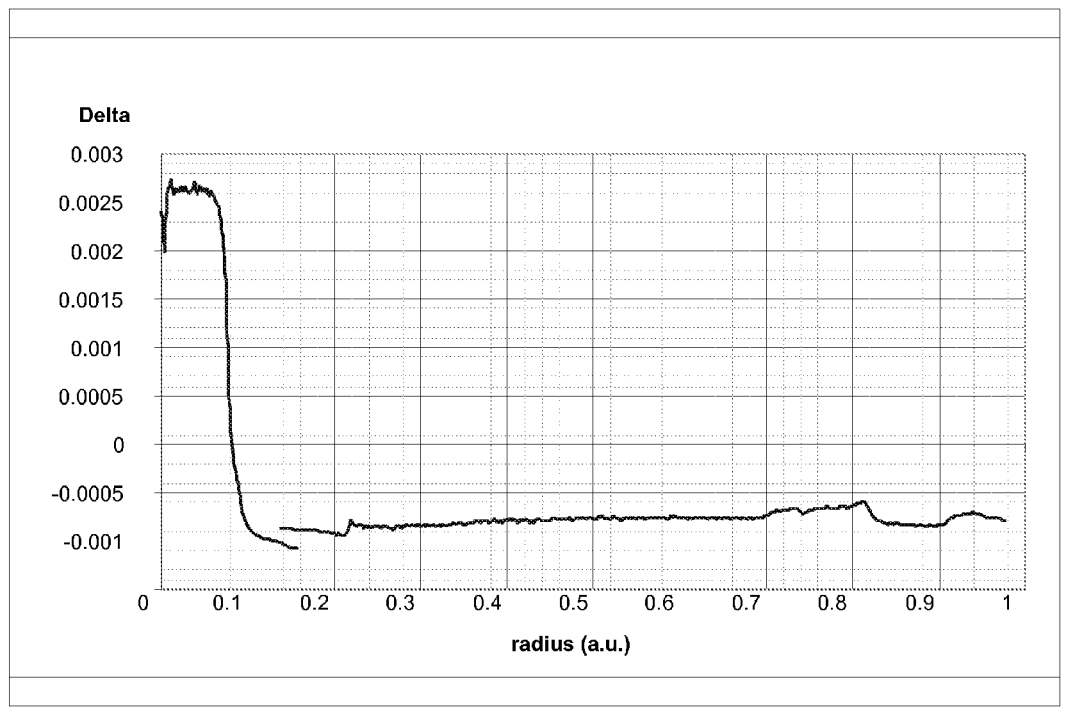
FIG. 5 is a plot of the refractive index delta profile of an exemplary core-clad blank.

The optical fiber 10 can be made from a fiber preform, for example, by:
(i) providing Vycor$^R$ glass tube 20 (which will form fiber cladding) with holes 23 for insertion of a plurality of stress rods, and a central hole 22 for the core rod (FIG. 4). After the core rod and the stress rods are inserted into the cladding portion of the preform, the resultant assembly can be redrawn into a smaller blank, and then drawn into an optical fiber 10, for example the optical fiber of FIG. 2 or 3. Alternatively, a core-clad preform (also referred to as a core-clad-blank) can be made first, and the holes 23 for receiving stress rods 23A, 23B can then be drilled at the appropriate locations in the cladding material of the preform An exemplary refractive index profile of such a core-clad blank is shown in FIG. 5. In this core-blank embodiment, the clad portion of the blank contained 3 wt % B. Two of the stress rods were made of silica doped with 13 wt % B. The other two stress rods were made of pure silica. The pure silica stress rods (e.g. rods 23B) can be made by chlorine drying silica soot preforms to remove the hydroxyls in the silica soot during the drying step of consolidation process. Then, the silica soot preform has the chlorine removed actively by introducing carbon monoxide or simply leaving it out gas for a period of time (e.g., 2 to 10 hours) at about 1200° C. to passively outgas the chlorine. After the degassing, the soot preform is sintered (sintering step of the consolidation process) in He atmosphere at about 1450° C. and redrawn into appropriate size stress rods (e.g., rods 23B). If the glass tube 20 (corresponding to fiber cladding) is made with Cl doped silica (0.3 to 1 wt % Cl), it can be made similarly to the above described method for making pure silica rods, except the Cl is left on during the sintering step, in order to retain Cl in the glass.

Figure 6:
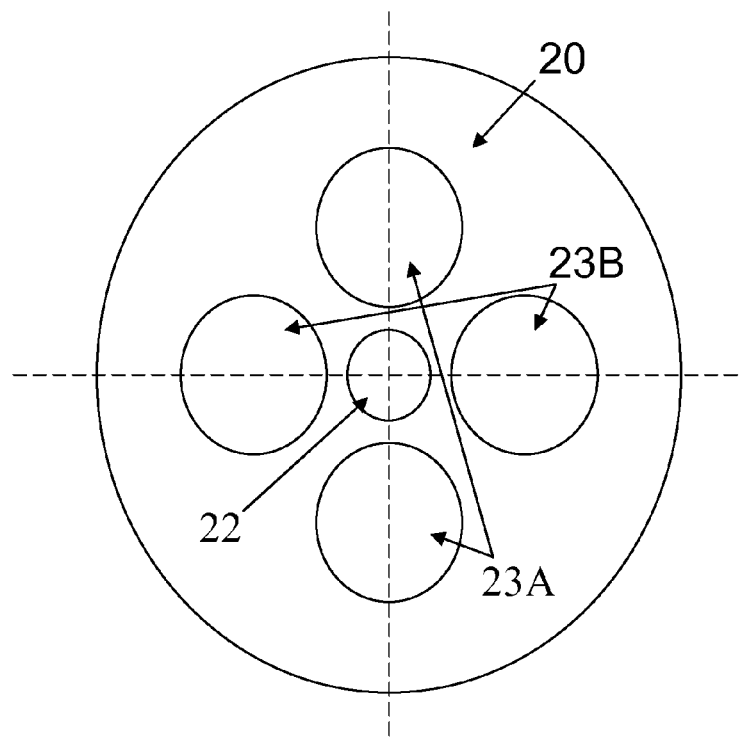
FIG. 6 is a schematic of the cross-sectional view of an exemplary core-clad preform.

After the stress rods 23A, 23B were inserted into their respective holes 23, the assembled fiber preform (FIG. 6) was drawn under vacuum to produce 125-µm diameter fiber. The draw temperature was between 1875° C. and 1925° C. and the draw speed was between 3 m/s and 7 m/s. The draw tension was 40 g for all samples. A resulting exemplary optical fiber cross-section (after the fiber was cut) is illustrated in FIG. 3 (fiber Embodiment 1). The exemplary optical fibers of this embodiment had spectral attenuation of 2.5-4.5 dB/km at 1550 nm and, mode field diameter (MFD) of 9.6-9.9 µm, and polarization beat length of 22-23 mm at 1550 nm wavelength.

Alternatively, rather than making a tube 20 with holes and subsequently filling the holes with rods, a "bundle approach" for making a preform may be utilized. In this case the opposing rods (e.g. pure silica, boron doped rods and chlorine dope silica rods) are assembled around a core rod and then slipped in a surrounding silica tube and then drawn into fiber. This method will typically result in stress rods with non-circular cross-section. In this fiber the birefringence will be augmented by an additional set of rods of opposite sign.

Figure 7:
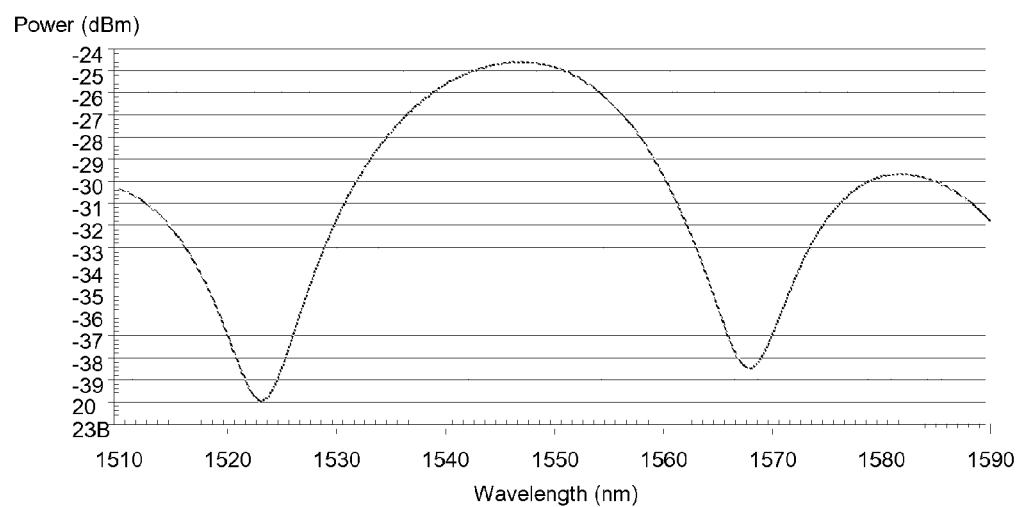
FIG. 7 is an OSA output signal used to measure beat length for one of the optical fiber embodiments.

The polarization beat length was measured using broadband light source, linear polarizer and analyzer at the fiber sample's (about 1 m in length) input and output ends, respectively. The optical spectrum analyzer (OSA) output for one of the measured exemplary fiber samples is shown in FIG. 7. Beat length Lb is calculated using the spectral period for the OSA signal $\Delta\lambda$, center wavelength $\lambda c$ (1550 nm in our case), and physical length of the sample L:

$$Lb=(\Delta\lambda/\lambda c)*L$$

The measured beat length range for 5 different fiber samples of the FIG. 3 fiber was between 21.4 mm and 23.9 mm.

Advantageously, the same level of birefringence as that achieved by already known fibers may now be created by using lower dopants and/or by creating smaller stress levels resulting from the pairs of the stress rods, because the stresses created in orthogonal directions have opposite signs. The lower boron doping level can make PM fiber manufacturing easier (fiber drawing stage). Alternatively, also advantageously, if one pair of stress rods utilizes a higher level of B (same level as that used in conventional PM fiber with B-doped stress rods), a larger amount of birefringence than achievable by conventional fiber can now be achieved due to the stress differential created by the two sets of stress rods 13A and 13B.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

One of advantages of at least some of the embodiments of optical fiber 10 is that the stress rods 13A and 13B have different CTE coefficients, which creates different signs for stress induced birefringence in the fiber core area by each pair of stress rods. The total effective birefringence value may be increased substantially versus birefringence of commercially available PM fibers, or the same level of birefringence may be obtained with lower level of doping of stress applying rods. Similarly, utilizing stress rods 13A and 13B that have different softening points from one another, and from that of the cladding material can additional birefringence and different stress signs in the fiber core area by each pair of stress rods. Furthermore, the use of two sets of stress applying parts (eg., stress rods) that have viscosities that are lower than that of silica doped rods doped with 20 wt % $B_2O_3$, advantageously results in less complex and/or faster drawing process. This can advantageously affect blank size, draw speeds, and result in a lower cost fiber.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber comprising:
    (i) a core having a first index of refraction $n_1$;
    (ii) a cladding having cladding material surrounding the core having a second index of refraction $n_2$, such that $n_1 > n_2$, said cladding surrounding at least two sets of glass stress rods extending longitudinally through the length of said optical fiber, the stress rods in one set of said at least two sets of glass stress rods having different softening points from softening points of the other set of stress rods; and
    (iii) wherein said optical fiber supports a single polarization mode or poses polarization maintaining properties within its operating wavelength range, wherein
        the core having a relative refractive index $\Delta_1$ (relative to cladding) such that $0.1\% \leq \Delta_1 \leq 2\%$, and comprising $GeO_2$ 6 to 40 wt %; the cladding material is silica based glass doped with Boron; and at least two of the stress rods are pure silica rods the cladding material having a softening point that is different from the softening point of either one of said stress rods.

2. The optical fiber of claim 1 wherein at least two of said stress rods in one set of stress rods are made of material different from material for at least two stress rods of said other set.

3. The optical fiber of claim 1, wherein the core has a relative refractive index $\Delta_1$ (relative to cladding) such that $0.2\% \leq \Delta_1 \leq 2\%$, and at least two of the stress rods are doped with Boron in the amount different from that of the cladding, and at least two of the stress rods are pure silica.

4. The optical fiber of claim 1, wherein two of said stress rods apply compressive force on said core and two of said stress rods apply tensile force on said core.

5. An optical fiber comprising:
    (i) a core having a first index of refraction $n_1$;
    (ii) a cladding having cladding material surrounding the core having a second index of refraction $n_2$, such that $n_1 > n_2$, said cladding surrounding at least two sets of glass stress rods extending longitudinally through the length of said optical fiber, the stress rods in one set of said at least two sets of glass stress rods having different softening points from softening points of the other set of stress rods; and
    (iii) wherein said optical fiber supports a single polarization mode or poses polarization maintaining properties within its operating wavelength range, wherein
        the core having a relative refractive index $\Delta_1$ (relative to cladding) such that $0.1\% \leq \Delta_1 \leq 2\%$, and comprising $GeO_2$ 6 to 40 wt %; the cladding material is silica based glass doped with Boron; and at least two of the stress rods are pure silica rods, the cladding material having a softening point that is different from the softening point of either one of said stress rods wherein the cladding material comprises at least one of the following dopants: $B_2O_3$: 1 to 5 wt %, F: 0.1 to 2 wt %, Cl: 0.1 to 1 wt %.

6. The optical fiber of claim 5, wherein the cladding comprises $B_2O_3$, 2.5 to 3.5 wt %, and/or Cl: 0.2 to 0.5 wt %.

7. A method of making a fiber with two sets of stress rods that have different coefficients of thermal expansion, said method comprising the step of:
    surrounding a core rod with a plurality of rods comprising a plurality of stress applying rods situated within a cladding material comprising silica doped with Boron; said core rod having a relative refractive index $\Delta_1$ (relative to cladding) such that $0.1\% <= \Delta_1 <= 2\%$, and comprising $GeO_2$ 6 to 40 wt %; said plurality of stress applying rods including two sets of stress rods with different coefficients of thermal expansion, wherein said plurality of rods include a third set of rods with a coefficients of thermal expansion that is different from said coefficients of thermal expansion of said two sets of stress applying rods.

8. A method of making a fiber according to claim 7, wherein said cladding has a different softening point from that of the stress applying rods.

9. The method of claim 8, wherein the softening point of said third set of rods is different from the softening point of either one of said stress applying rods.

10. The method of claim 7, wherein the CTE of at least one of the stress rods is $4*10E^{-7}/^\circ$ C. to $1*10E^{-6}/^\circ$ C., and the CTE of another one of said stress rods is $2*10E^{-6}/^\circ$ C. to $8*10E^{-6}/^\circ$ C.

* * * * *